(12) United States Patent
Koorn

(10) Patent No.: US 8,707,665 B2
(45) Date of Patent: Apr. 29, 2014

(54) CUTTING DISC ASSEMBLY FOR A MOWING DEVICE

(75) Inventor: Maarten Koorn, Maassluis (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/480,537

(22) Filed: May 25, 2012

(65) Prior Publication Data

US 2012/0240545 A1   Sep. 27, 2012

Related U.S. Application Data

(62) Division of application No. 12/370,658, filed on Feb. 13, 2009, now Pat. No. 8,205,423.

(30) Foreign Application Priority Data

Feb. 18, 2008   (NL) ..................................... 1035035

(51) Int. Cl.
  *A01D 34/52*   (2006.01)
  *A01D 34/73*   (2006.01)

(52) U.S. Cl.
  USPC .......................................................... 56/295

(58) Field of Classification Search
  USPC ........... 56/17.5, 255, 295, 6, DIG. 17; 30/276
  See application file for complete search history.

(56) References Cited

U.S. PATENT DOCUMENTS

| | | | | |
|---|---|---|---|---|
| 2,547,540 A | * | 4/1951 | Roberts | 56/255 |
| 2,634,571 A | * | 4/1953 | Lawrence et al. | 56/12.7 |
| 2,963,844 A | * | 12/1960 | Engler | 56/295 |
| 3,184,907 A | * | 5/1965 | Harloff | 56/295 |
| 3,320,732 A | * | 5/1967 | Kirk | 56/295 |
| 3,397,525 A | | 8/1968 | Woodring | |
| 3,500,622 A | * | 3/1970 | Bowen | 56/295 |
| 3,507,104 A | * | 4/1970 | Kline et al. | 56/295 |
| 3,621,642 A | * | 11/1971 | Leake, Jr | 56/295 |
| 3,690,051 A | * | 9/1972 | Wood | 56/295 |
| 3,715,874 A | * | 2/1973 | Goserud | 56/295 |
| 3,716,973 A | * | 2/1973 | Kidd | 56/6 |
| 3,958,402 A | * | 5/1976 | Bouet | 56/295 |

(Continued)

FOREIGN PATENT DOCUMENTS

| | | |
|---|---|---|
| DE | 2316308 A | 10/1974 |
| FR | 2776953 A1 | 10/1999 |
| GB | 1220353 A | 1/1971 |

OTHER PUBLICATIONS

Dutch Search Report issued on Sep. 30, 2008.

*Primary Examiner* — Árpád Fábián-Kovács
(74) *Attorney, Agent, or Firm* — Hoyng Monegier LLP; Coraline J. Haitjema; David P. Owen

(57) ABSTRACT

A mowing device for plants includes at least one rotor with a first rotation axis, and at least one blade which is driven in rotation by the rotor, in which the blade is attached to a blade holder during normal operation. By a blade pivot pin or shaft that is situated at a radial distance from the first rotation axis. This allows the blade to be freely rotatable through at least a predetermined angle. The blade pin can be displaced radially inwards. The blade holder is connected to the rotor about a latent dedicated second rotation axis; and the first and second rotation axes and the blade pivot pin determine a triangle in a plane of projection at right angles to the first rotation axis.

9 Claims, 5 Drawing Sheets

(56) References Cited

U.S. PATENT DOCUMENTS

| | | | |
|---|---|---|---|
| 4,058,959 A * | 11/1977 | Moss et al. | 56/295 |
| 4,062,171 A * | 12/1977 | Rose | 56/295 |
| 4,103,476 A * | 8/1978 | Oosterling et al. | 56/13.6 |
| 4,114,354 A * | 9/1978 | Morris | 56/295 |
| 4,158,944 A * | 6/1979 | Rabinow | 56/11.3 |
| 4,258,536 A * | 3/1981 | Kidd et al. | 56/17.5 |
| 4,313,297 A * | 2/1982 | Maier | 56/295 |
| 4,345,420 A * | 8/1982 | Oosterling et al. | 56/295 |
| 4,525,990 A * | 7/1985 | Zweegers | 56/295 |
| 4,827,704 A * | 5/1989 | van der Lely et al. | 56/13.6 |
| 4,984,418 A * | 1/1991 | van der Lely et al. | 56/13.6 |
| 5,090,186 A | 2/1992 | Andersen | |
| 5,271,212 A * | 12/1993 | Anderson | 56/12.7 |
| 5,581,985 A * | 12/1996 | Secosky | 56/10.3 |
| 5,649,413 A * | 7/1997 | Oostendorp | 56/12.7 |
| 5,673,545 A * | 10/1997 | Friesen | 56/255 |
| 5,791,131 A * | 8/1998 | Hill et al. | 56/295 |
| 6,026,635 A * | 2/2000 | Staiger | 56/295 |
| 6,357,215 B1 * | 3/2002 | Thorne | 56/295 |
| 6,442,845 B2 * | 9/2002 | Wheeler et al. | 30/276 |
| 6,460,253 B1 * | 10/2002 | Wheeler et al. | 30/276 |
| 6,688,193 B2 * | 2/2004 | Wohlford et al. | 74/606 R |
| 6,829,878 B1 * | 12/2004 | Hoffman | 56/295 |
| 6,865,869 B2 * | 3/2005 | Penny | 56/8 |
| 7,490,459 B2 * | 2/2009 | Thompson et al. | 56/255 |
| 7,543,432 B1 * | 6/2009 | Osborne | 56/17.5 |
| 7,743,478 B2 * | 6/2010 | Thompson et al. | 29/426.1 |
| 8,186,135 B2 * | 5/2012 | Leonardi et al. | 56/12.7 |
| 2001/0027610 A1 * | 10/2001 | Wheeler et al. | 30/276 |

\* cited by examiner

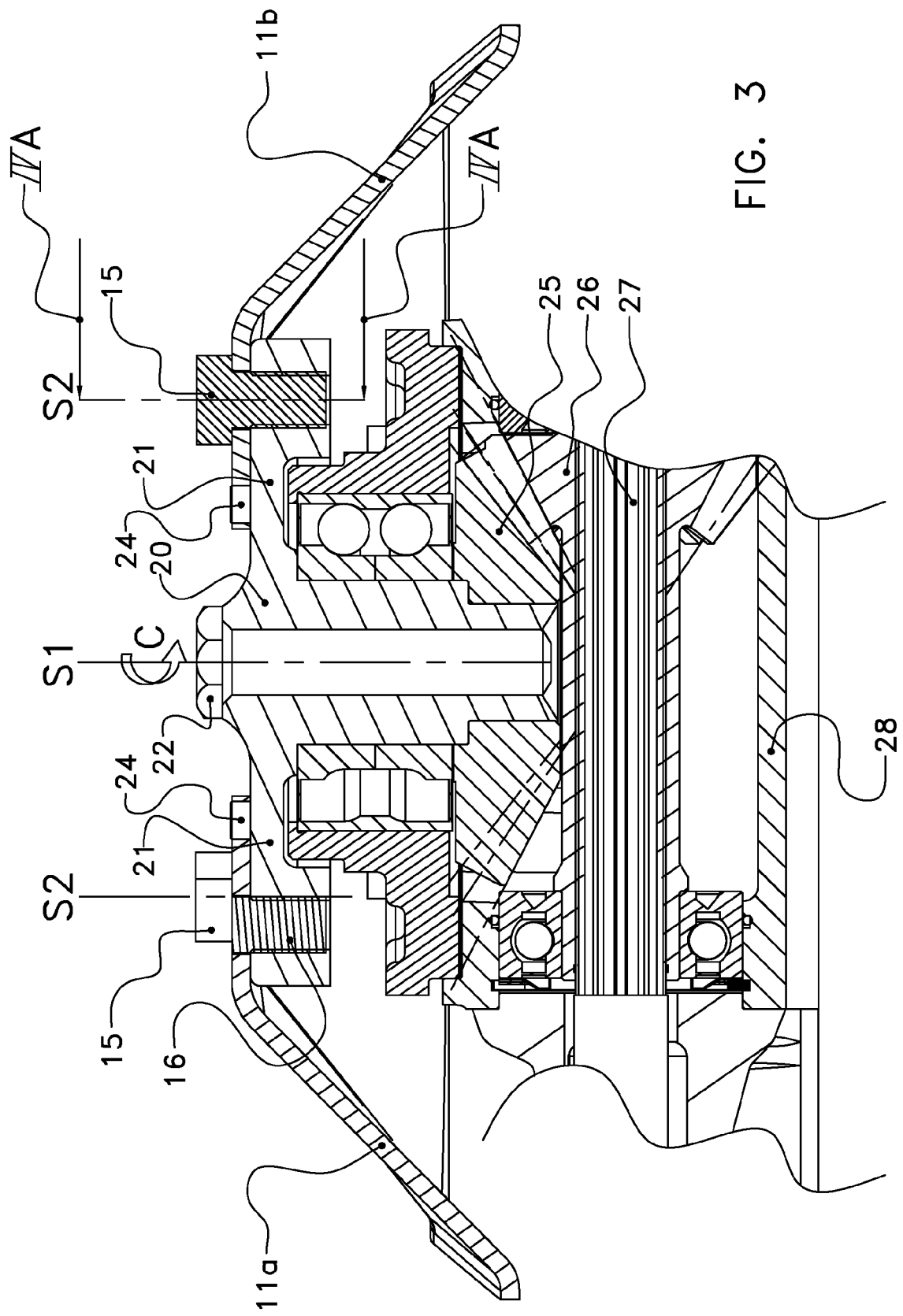

CUTTING DISC ASSEMBLY FOR A MOWING DEVICE

CROSS REFERENCE TO RELATED APPLICATIONS

This is a divisional application of prior application Ser. No. 12/370,658, and claims priority from Netherlands patent application number NL1035035 filed on Feb. 18, 2008, the contents of which are hereby incorporated by reference in their entirety.

BACKGROUND OF THE INVENTION

1. Field of the Invention

The invention relates to a mowing device for plants, such as grass.

2. Description of the Related Art

Mowing devices are known comprising a series of adjacent cutting discs arranged on a beam structure, each of which is provided with one or more cutting blades and is rotated about vertical centre axes. The mowing device can in this case be coupled to an external drive, such as a power take-off of a tractor.

By means of a central top cover and a central bolt, the cutting disc is attached to a hub which forms part of the rotor. In this case, the cutting disc rests on a top flange of the hub.

Each of the cutting blades is elongate and rotatably attached to the cutting disc by means of a vertical bolt connection, so that, when a foreign object is hit, the cutting blade can turn inwards, out of the way of the object. When the blade is turned inwards with great force as a result of the impact, it may hit parts of the mowing beam which could thereby become damaged. In order to prevent the latter, the cutting disc is provided with a stop which is fitted on the bottom side of the cutting disc.

Not only the blades, but also the cutting discs themselves can hit foreign objects. The cutting discs may in this case become deformed and/or cause the drive components to be overloaded. These drive components may become damaged in the process and may have to be replaced. The cutting discs can also be deformed after such a blow and/or become misaligned with the adjacent cutting discs, which may result in the blades interfering with one another and further damage being caused.

BRIEF SUMMARY OF THE INVENTION

The present invention addresses these problems by providing a mowing device which makes it possible to reduce the risk of damage occurring as a result of said impact and to reduce the consequences of said impact. It is an object of the invention to provide a mowing device which will be damaged less easily if such an impact occurs, and to provide a mowing device which will become overloaded less easily if such an impact occurs.

According to one aspect, the invention provides a mowing device for plants, comprising at least one rotor with a rotor axis or first rotation axis, in particular a vertical rotor axis, and at least one blade driven in rotation by the rotor, in which the blade is attached to a blade holder, which is attached to the rotor and is at least potentially rotatable about a second rotation axis which is situated at a radial distance from the first rotation axis.

By making the holder of the blade potentially rotatable, the blade holder and the blade will be able to carry out a pivoting movement after an impact, thus making it possible to prevent damage to parts.

In one embodiment, the blade holder is then rotatable between a normal operating position, in which the orbit path of the blade holder has a greatest first diameter, and a retracted impact position, in which the orbit path has a greatest second diameter, the first diameter being greater than the second diameter. The mowing device can in this case be provided with means for forcing the blade holder to the impact position.

The connection of the blade holder to the rest of the rotor may comprise a shearing connection which keeps the blade holder in the normal operating position, in which rotation of the blade holder about the second rotation axis is prevented. Upon impact, the shearing connection breaks and rotatability is possible.

In one embodiment, it is possible to allow the second rotation axis, viewed in a perpendicular projection on a plane at right angles to the rotor axis, to be situated outside the blade, as a result of which the joint pivoting movement can be boosted.

The inward pivoting movement following an impact is supported by situating the second rotation axis, viewed in the direction of rotation of the rotor, in front of the frontmost radial plane through the first rotation axis and the blade.

When installing the blade holder, it may be advantageous if the distance between the second rotation axis and the rotor axis is smaller than the distance between the radial inner end of the blade and the first rotation axis.

In a further development of the mowing device according to the invention, the assembly of the blade holder and blade, viewed in the normal operating position, consists of a first portion which is situated, viewed in the direction of rotation of the rotor, in front of the radial plane with respect to a radial plane through the rotor axis or first rotation axis and the second rotation axis, and a second portion, adjoining the first portion and situated behind said radial plane to which the blade is attached, in which the first portion has a mass which is greater than the mass of the second portion. With such an arrangement, the holder might bend to a position where the blade and the blade holder are pivoted inwards.

In this case, the mowing device may be provided with a shearing connection between the respective blade holder and the rest of the rotor in order to keep the blade holder in the normal operating position. Upon the abovementioned impact, the shearing connection will break and the holder can then rotate in order to pivot the blade and the blade holder inwards.

In one embodiment, the rotor is provided with several separate blade holders which are each provided with a blade and which are arranged at regular distances from one another in the direction of rotation. Viewed in a perpendicular projection on a plane at right angles to the rotor axis, the blade holders may determine an interrupted plane, which may result in a saving in mass. Furthermore, the accessibility of the rotor can be improved for inspection, replacement of parts or lubrication.

Preferably, the shearing connection is designed to release several holders upon said impact so that they can rotate, thus preventing imbalance. In a simple embodiment, the shearing connection is combined for several blade holders. In another simple embodiment, the shearing connection is arranged in between blade holders.

In one embodiment, the rotor is provided with one or more stops for limiting the rotation of the blade holder about the second rotation axis. Thus, the blade itself does not have to absorb the impact load acting on the stop.

In a further development of the mowing device according to the invention, the blade is attached to the blade holder so as to be rotatable about a third rotation axis which is situated at a distance from the second rotation axis and preferably substantially parallel to the first rotation axis. Upon impact, the blade can then perform two additional rotation movements (that is in addition to the rotor movement).

In this case, the second rotation axis, viewed in the direction of rotation of the rotor, may be situated in front of a radial plane through the first rotation axis and the third rotation axis.

According to a further aspect, the invention provides a mowing device for plants, comprising a rotor with a rotor axis or first rotation axis, in particular a vertical rotor axis, and at least one blade driven in rotation by the rotor, in which the mowing device comprises a blade holder for the blade, in which the blade is, during normal operation, attached to the blade holder by a blade pivot pin or shaft which is situated at a radial distance from the first rotation axis so as to be freely rotatable, at least through an angle, in which the blade pivot pin can be displaced radially inwards. In this case, the blade pivot pin may be displaceable with a tangential directional component which extends in the same direction as the direction of rotation of the rotor. During normal use (i.e. when there has not yet been any impact), the blade may be able to rotate about the blade pivot pin against a stop, as is usual.

The blade holder can be connected to the rest of the rotor about a latent dedicated second rotation axis, which is situated at a distance from both the first rotation axis and the pivot pin. The first and second rotation axes and the pivot pin may determine a triangle in a plane of projection at right angles to the first rotation axis.

According to a further aspect, the invention provides a mowing device for plants, comprising at least one rotor with a rotor axis, in particular a vertical rotor axis, and at least two blades driven in rotation by the rotor, in which each blade is attached to an associated blade holder, in which the blade holders are parts which are separate from one another and are attached to the rotor via a shearing connection.

Preferably, the shearing connection is designed to release several blade holders upon said impact so that they can rotate, thus preventing imbalance. In a simple embodiment, the shearing connection is provided in between blade holders.

In an alternative embodiment, the shearing connection operates between each blade holder and a central part of the rotor. The central part of the rotor may form a hub for locking the bearings of the rotor. Alternatively, the central part itself may be attached to a hub which is intended for locking the bearings of the rotor.

According to a further aspect, with one or more of the above-described mowing devices, the invention provides that the rotor, which drives the blades for rotation in a blade rotation plane, is provided with means for bringing the blade outside the blade rotation plane when the blade holder is rotated with respect to the rest of the rotor. Following the impact mentioned, the respective blade, viewed vertically, then comes to lie above or below and outside the path of the blades of the adjacent cutting discs.

These means may, for example, comprise inclined surfaces for the blade holder, which become active upon rotation of the blade holder about its rotation axis. Following the said impact, the blade holder, and thus the blade which is attached thereto, will be forced into a higher or lower position by the inclined surfaces. Preferably, the inclined surfaces engage with the bottom side of the blade holder and extend upwards.

These means may, for example, also or alternatively comprise an arrangement of the blade holder in which the rotation axis for the blade holder is at an angle to the blade rotation plane.

Preferably, the rotation axis of the blade holder extends in an upward direction and, viewed in the direction of rotation of the blade holder about its rotation axis, backward direction with respect to a line which contains the rotation axis of the blade holder and a point of the blade, preferably of the cutting edge of the blade, preferably of the outer end of the cutting edge of the blade.

According to a further aspect, the invention provides a mowing device for plants, comprising at least one rotor with a rotor axis or first rotation axis, in particular a vertical rotor axis, and at least one blade which is driven in rotation by the rotor and in this case travels in a blade rotation plane, in which the blade is attached to a blade holder, which co-rotates with the rotor, in which the blade holder is connected to the rest of the rotor via a shearing connection and, when the latter breaks, is rotatable with respect to the rest of the rotor, in which the rotor is provided with means for bringing the blade outside the blade rotation plane when the blade holder is rotated with respect to the rest of the rotor.

According to a further aspect, the invention provides a mowing device for plants, comprising at least one rotor with a rotor axis or first rotation axis, in particular a vertical rotor axis, and at least one blade which is driven in rotation by the rotor, in which the blade is attached to a blade holder, which co-rotates with the rotor and is attached to the rotor so as to at least potentially be rotatable about a second rotation axis which is situated at a radial distance from the rotor axis, in which the centre of gravity of the blade holder with the blade, viewed with respect to a line through the first and the second rotation axes, is situated on the side of that line which is turned away from the blade.

According to a further aspect, the invention provides a method for mowing plants, in which plants are mowed using a mowing device comprising at least one rotor with a rotor axis or first rotation axis, in particular a vertical rotor axis, and at least one blade which is driven in rotation by the rotor, in which a blade edge of the blade is turned opposite to the direction of rotation of the rotor in order to cut the plants while passing through a first orbit path, in which the blade, when it encounters an object which cannot be cut, rotates under the effect of a centrifugal force of the rotor rotation about a second rotation axis at a radial distance from the first rotation axis to a stable, retracted position under the effect of a centrifugal force of the rotor rotation, in which it follows a second orbit path which is concentric to the first orbit path but has a smaller diameter.

According to a further aspect, the invention provides a blade holder which is clearly suitable and intended for a mowing device according to the invention.

The aspects and measures described in this description and claims of the application and/or illustrated in the drawings of this application can, where possible, also be applied separately. These separate aspects, such as blades which pivot with holders, blades which rotate in multiple directions, several separate blade holders, the vertical displacement of the blades following an impact, and other aspects may be the subject of divisional patent applications to this effect. This applies in particular to the measures and aspects which have been described as such in the subclaims.

BRIEF DESCRIPTION OF THE DRAWINGS

The invention will be explained with reference to an exemplary embodiment illustrated in the attached drawings, in which:

FIG. 3 shows a vertical view with cross section of the cutting disc assembly from FIG. 2;

DESCRIPTION OF ILLUSTRATIVE EMBODIMENTS

Figure 1:
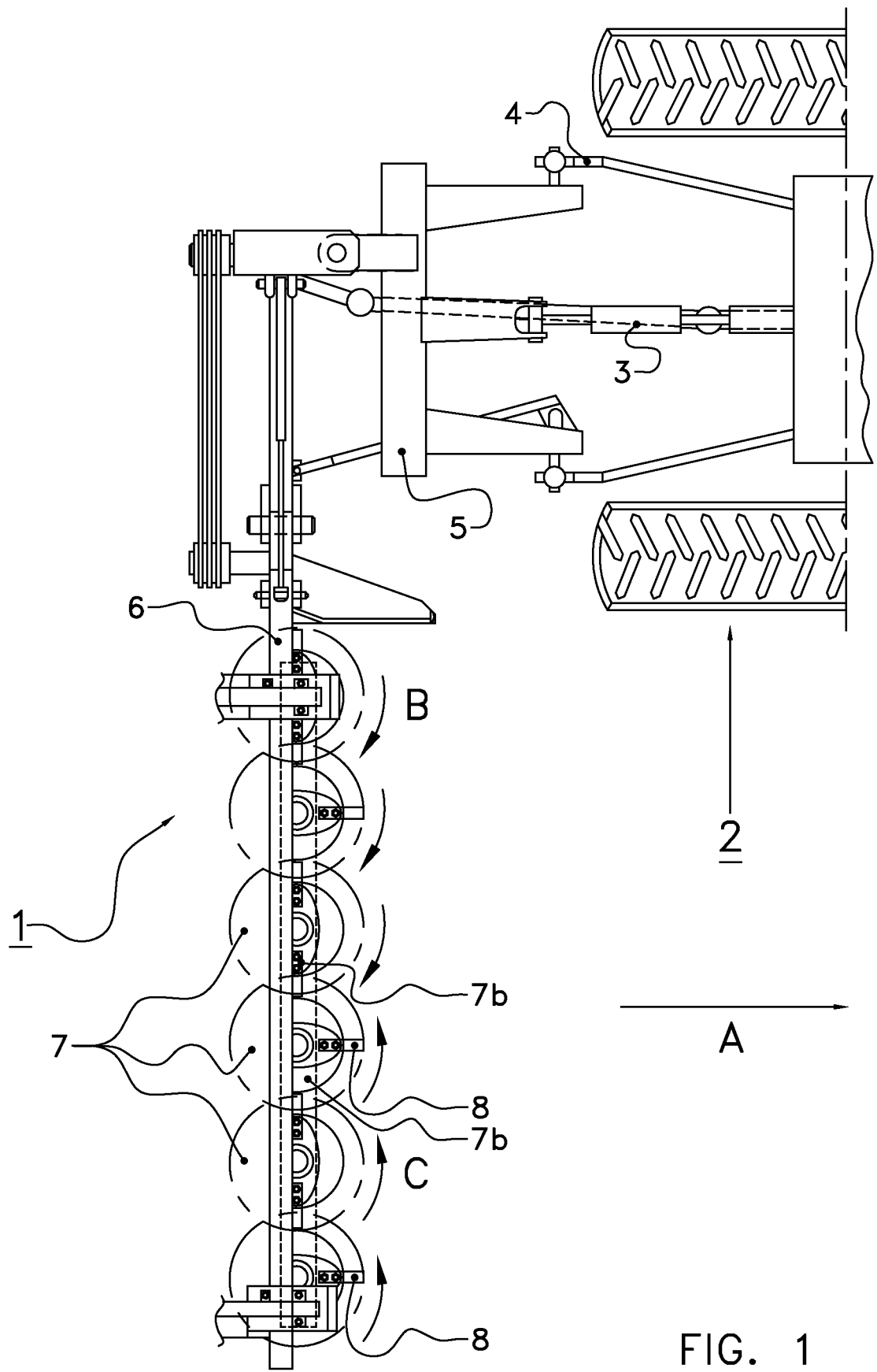
FIG. 1 shows a top view of a mowing device.

The following is a description of certain embodiments of the invention, given by way of example only and with reference to the drawings. The mowing device 1 illustrated in FIG. 1 is attached, by means of frame 5, to the three-point suspension 4 of a tractor 2 which can move in a forward direction A. A power take-off 3 is connected to the mowing device for driving the former.

The frame 5 has a transversely projecting mowing beam 6, which accommodates a drive mechanism (not shown) which is coupled to the power take-off 3. The mowing beam furthermore has a series of cutting disc assemblies 7, the disc assemblies 7a of which rotate in the one direction B and the disc assemblies 7b rotate in the opposite direction C. In this example, the cutting disc assemblies have two blades 8 situated at opposite positions.

Figure 2:
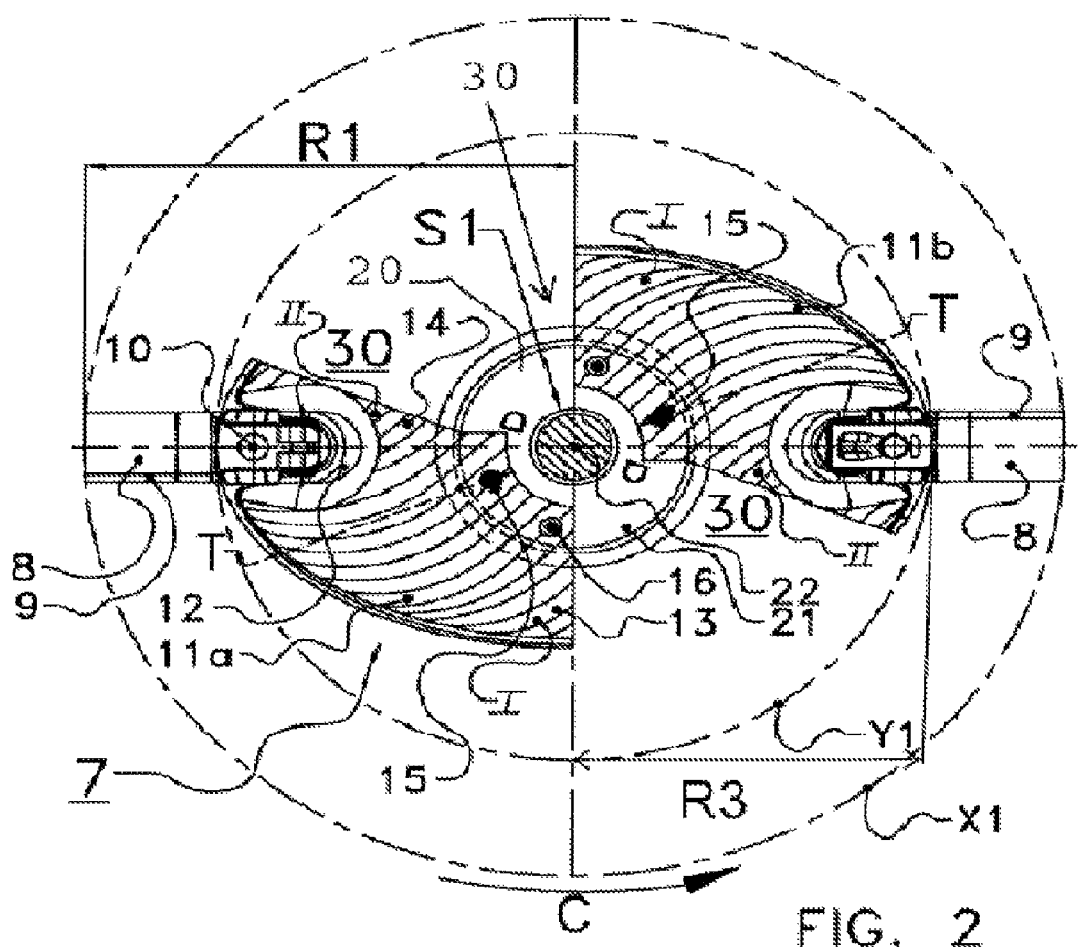
FIG. 2 shows a top view of a cutting disc assembly with two blade holders according to an embodiment of the invention, during normal operation.
Figure 2A:
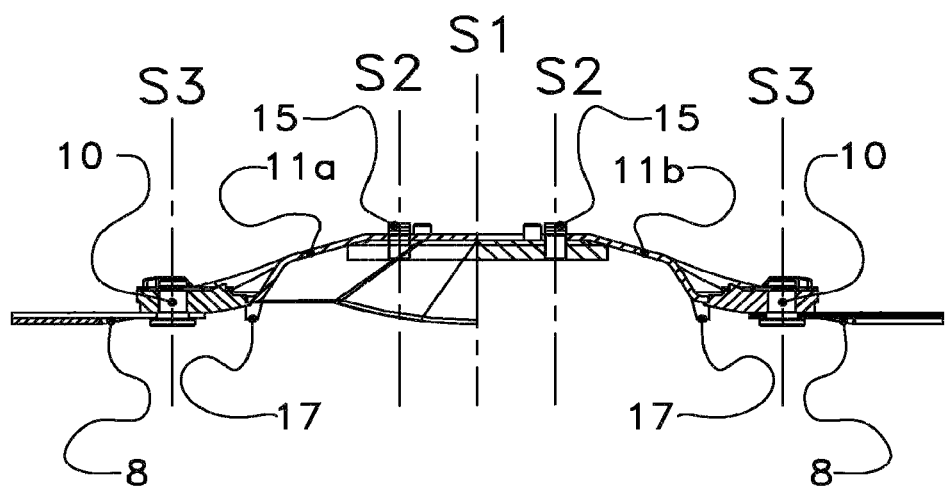
FIG. 2A shows a vertical cross section through a portion of the assembly from FIG. 2, along line IIA-IIA.
Figure 4A:
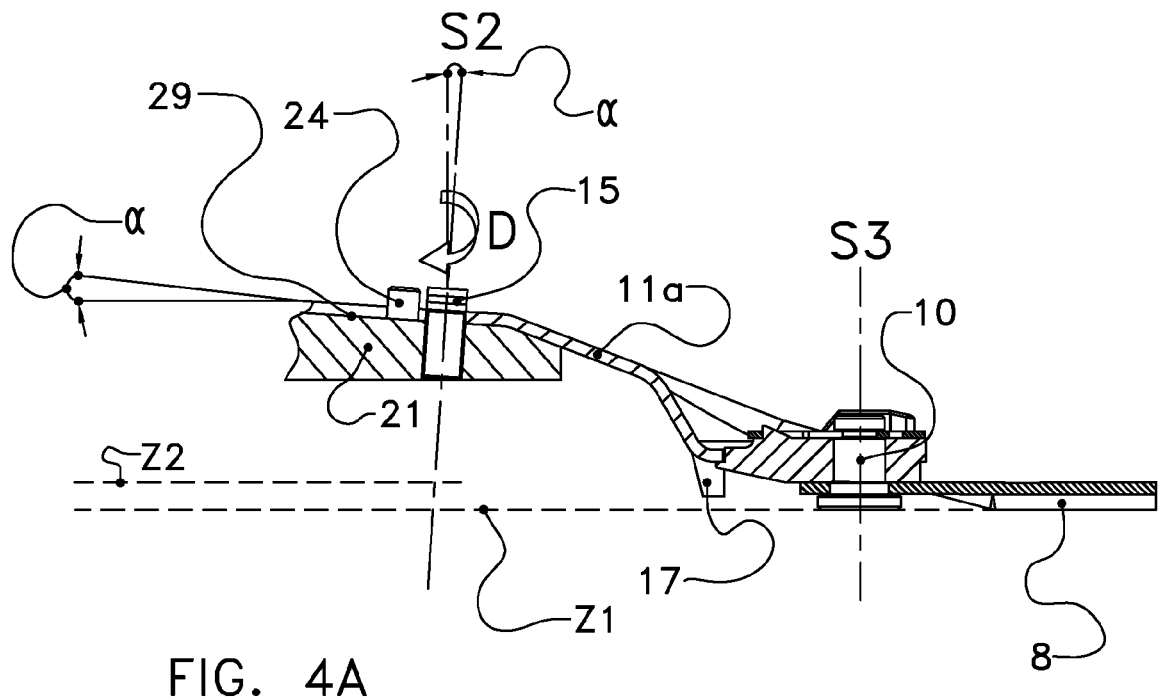
FIG. 4A shows a diagrammatic representation of a possible attachment of a blade holder according to the invention.

The cutting disc assembly 7 is illustrated in more detail in FIGS. 2 and 3. Each blade 8 is provided with a cutting edge 9, which is directed in the direction of rotation C. By means of a pivot pin 10, each blade 8 is attached to a dedicated blade holder 11a, 11b, each of which is bent and panel-shaped (with the concave side on top) and, viewed in top view, have gaps 30 between them. The blade holders 11a,b have a leading edge region 13, which is formed in order to pass plants mowed by the preceding blade upwards, and a trailing edge region 14. The blade holders 11a,b are rotatably attached to a flange 21 of a hub 20 of the rotor 29 by means of bolts 15, illustrated in more detail in FIG. 3, the respective rotation axis being denoted by S2. The blades 8 themselves are attached to the dedicated blade holder 11a, 11b so as to be rotatable about rotation axis S3 of the pivot pin 10, with the pivot angle being limited by a stop 17 as shown in FIGS. 2A and 4A at the bottom side of the respective blade holder, if desired. The rotation axes S1 and S3 are vertical and parallel to one another. The blade holders 11a,b are furthermore fixed to the flange 21 by means of breaking pins 16, as a result of which, during normal operation, without impact, they are held against rotation about rotation axis S2. However, following breaking of the breaking pin 16, they are potentially rotatable about said axis. By means of a central bolt 22, the hub 20 is attached to a gearwheel 25 which is driven by a drive shaft 27 via a right-angled transmission with gearwheel 26. The drive shaft 27 is indirectly driven by the power take-off 3 and extends in the longitudinal direction of the mowing beam 6 through housing 28 and drives several cutting disc assemblies which are arranged next to one another.

In FIGS. 2 and 3, the central rotation axis S1 of the cutting disc assembly 7 is indicated. In FIG. 2, the outer path X1 of the ends of the blades 8, having a radius R1, is indicated and the outer path Y1 of the edge of the blade holders 11a,b is, having a radius R3, indicated. By drawing a radial T running through hinge 15, the blade holder can be seen divided into a first portion I and a second portion II, which also carries the blade 8. The first portion I has a mass which is greater than that of the second portion II.

If, during operation, a blade 8 hits a hard foreign object, such as a stone, the blade can turn inwards about rotation axis S3. If the impact force experienced exceeds a specific value, the respective blade holder 11a, 11b can exert a force on the connection with the hub 20, as a result of which the breaking force of the breaking pin 16 is exceeded. This may also occur when the blade holder 11a, 11b itself hits the foreign object. In this case, it should be considered, that the speed in the direction A may be 15 km/h and the rotary speed of the cutting disc assembly 7 may be 3000/min. As a result of the breaking of the breaking pin 16, the respective blade holder remains connected to the hub 20 only at the location of bolt 15. As a result of the larger mass of portion I, the latter will bend outwards and the second portion II will bend inwards about the hinge 15 and rotation axis S2. The outer path X2 of the respective blade end will now take up a smaller radius R2. The outer path Y2 of the edge of the blade holders 11a,b will also take up a smaller radius R4. The same will happen if the other blade and/or the other blade holder also hits the same hard object. As a result of the weight distribution in the blade holders, the two blade ends and blade holders remain in the retracted position, in which they are outside the path of the blade ends and blade holders of the adjacent cutting disc assemblies.

If desired, a stop 24 may be provided on the hub or the other blade holder by means of which the blade holder is held in the position from FIG. 3.

If desired, a clamping means may be provided on the hub 20 or on the other blade holder 11b;11a, by means of which the inward rotation of the blade holder 11a;11b is limited.

It is also possible to combine the breaking pins 16 into a single shearing connection which is active directly between both blade holders 11a,b, for example in the form of a pull strip (not shown). Alternatively, the blade holders may overlap at the location of a single breaking pin which extends through both blade holders and the rest of the rotor, such as hub 20.

Figure 4:
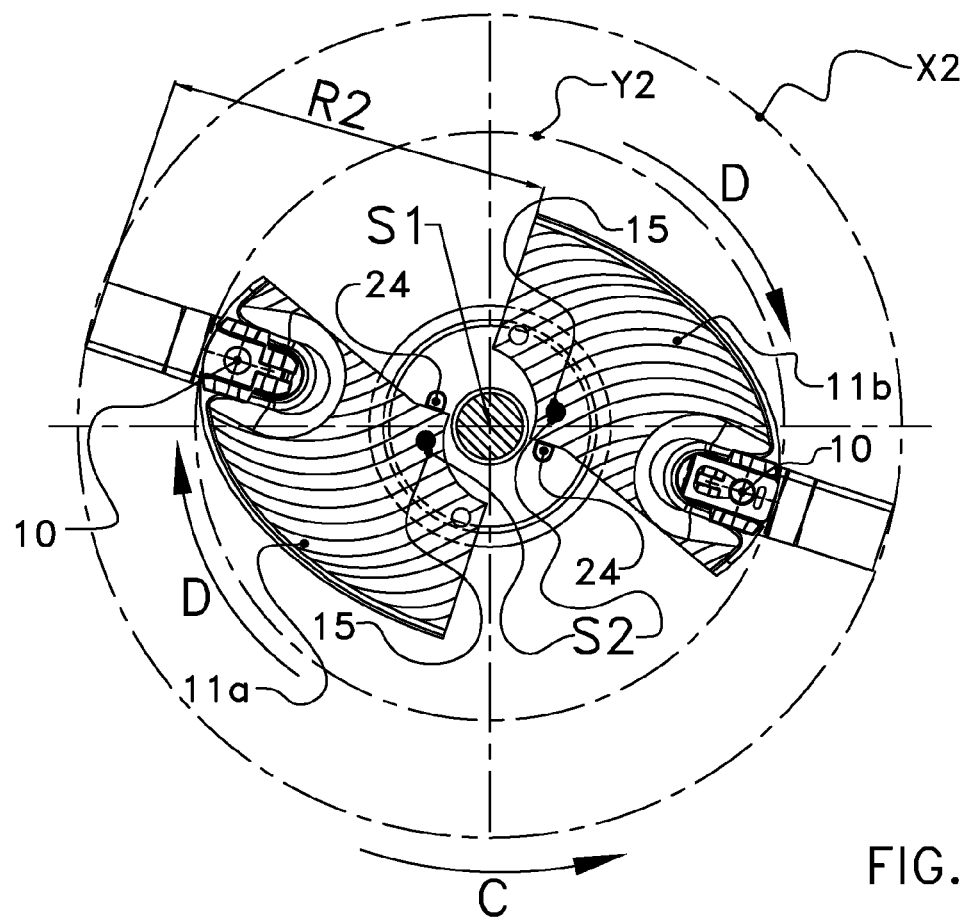
FIG. 4 shows the cutting disc assembly from FIG. 3, after an impact.
Figure 4B:
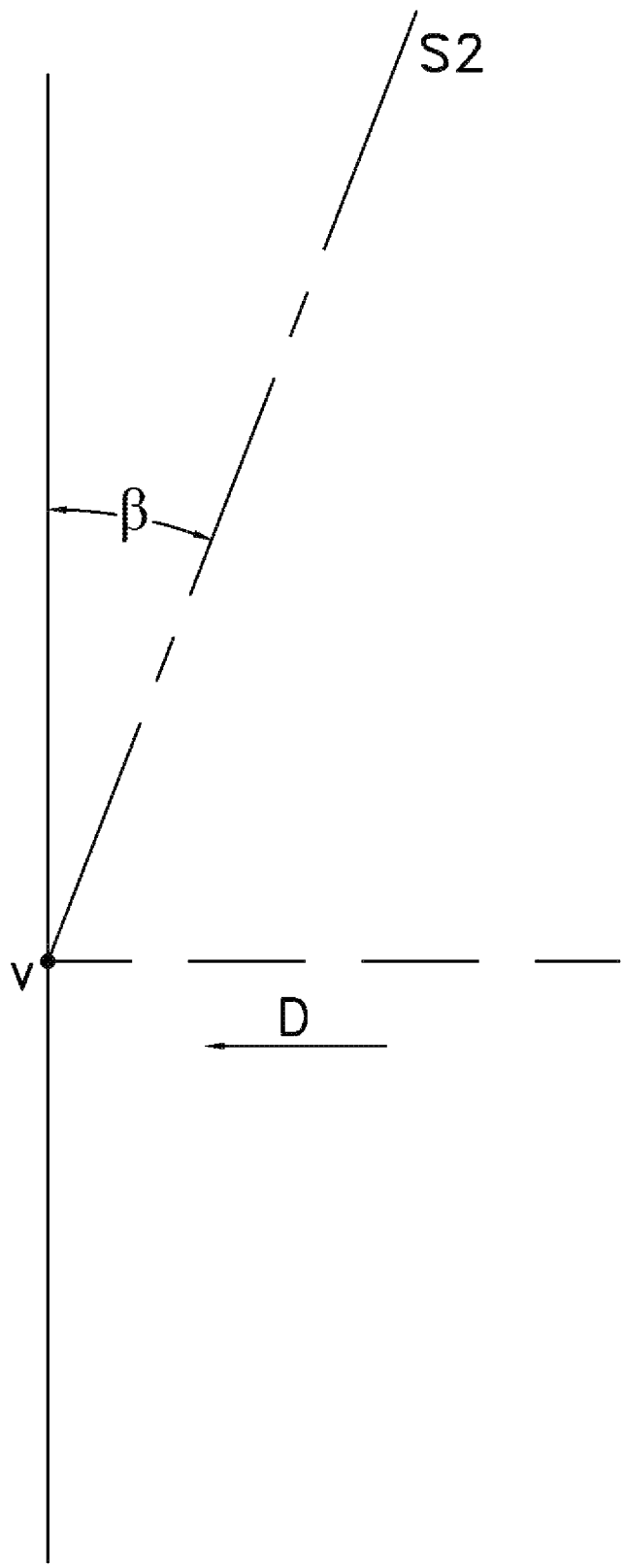
FIG. 4B shows a diagrammatic representation of a possible angular range for the direction of a rotation axis for a blade holder.

In order, after impact, to bring the blades 8 and/or the blade holder edges outside the paths of adjacent similar parts, further embodiments may include one or more features by means of which the position in the vertical direction is changed. This can be done, for example, by designing the supporting surface 29 on the flange 21 for the blade holder 11a,b to rise in the direction of rotation of the blade holder 11a,b about rotation axis S2 (FIG. 4A). After the shearing connection has broken, the blade holder will then be forced upwards over the ascending surface 29, resulting in the blade 8 coming to lie higher as well (from Z1 to Z2). In this case, or alternatively, the rotation axis S2 may be allowed to be at an angle, by designing the hole in the flange 21 for the bolt 15 accordingly (FIG. 4A). The angle α of the ascending surfaces 29 and of rotation axis S2 may be in the order of magnitude of 10-20 degrees, so that the vertical displacement can take place quickly. The direction of the inclination can be related to the cutting edge of the blade 8, in particular the end thereof, so that this moves directly upwards after the breaking pin 16 has broken. In FIG. 4B, the line v has been rendered as a spot, which line, on the one hand, contains the intersection of a vertical and the rotation axis S2 and contains, on the other hand, the end of the cutting edge of the blade 8 (see also FIG. 4). In this example, the rotation axis will be situated in the upward direction on the trailing side (based on the direction of rotation D after impact) of the vertical. The rotation axis S2 is in this case inclined at an angle β of, for example, the above-mentioned 10-20 degrees.

The above description is given in order to illustrate the operation of preferred embodiments of the invention and not in order to limit the scope of the invention. On the basis of the above explanation, many variations which fall within the spirit and scope of the present invention will be obvious to the person skilled in the art.

What is claimed is:

1. A mowing device, comprising:
   a rotor with a first rotation axis;
   at least one blade holder for holding a blade; and
   at least one blade rotatably driven by the rotor;
   connection means connecting the at least one blade holder to the rotor and providing a latent, second rotation axis, wherein the at least one blade is attached to a corresponding blade holder by a blade pivot pin or shaft which is situated at a radial distance from the first rotation axis, so that the blade is freely rotatable at least through an angle,
   wherein the at least one blade holder is further connected to the rotor via a breakable connection which breaks upon an impact having a force exceeding a breaking force value, thereby releasing the at least one blade holder such that the at least one blade holder becomes rotatable about the second rotation axis and the blade pivot pin or shaft is displaceable in a radially inward direction with respect to the first rotation axis; and,
   wherein the first rotation axis, the latent, second rotation axis, and the blade pivot pin or shaft determine a triangle in a plane of projection perpendicular to the first rotation axis.

2. The mowing device according to claim 1, wherein the blade pivot pin or shaft is displaceable with a tangential directional component which extends in the same direction as the direction of rotation of the rotor.

3. The mowing device according to claim 1, wherein the at least one blade holder is rotatable about the second rotation axis between a normal operating position, in which an orbit path of the blade holder has a greatest first diameter, and a retracted position, in which the orbit path of the blade holder has a greatest second diameter, the first diameter being greater than the second diameter.

4. The mowing device according to claim 3, wherein the effect of a centrifugal force of the rotor rotation holds the at least one blade holder in the retracted position.

5. The mowing device according to claim 1, wherein, in the normal operating position, the second rotation axis of the blade holder, viewed in the direction of rotation of the rotor, is situated in front of a vertical radial plane through the first rotation axis and the blade pivot pin or shaft.

6. The mowing device according to claim 1, wherein the breakable connection comprises a breaking pin connecting the blade holder to the rotor to prevent rotation of the blade holder about the second rotation axis during normal operation, and permit rotation of the blade holder about the second rotation axis when the breaking pin has been broken.

7. The mowing device according to claim 1, wherein the blade pivot pin is displaced radially inwards when the blade holder is rotated about the second rotation axis.

8. The mowing device according to claim 1, wherein the at least one blade holder comprises an inclined surface.

9. The mowing device according to claim 1, wherein a stop is provided on the hub or on the at least one blade holder.

* * * * *